(12) United States Patent
Holderman et al.

(10) Patent No.: US 9,844,902 B2
(45) Date of Patent: Dec. 19, 2017

(54) MODULAR MOLD SYSTEM

(71) Applicant: Zimmer, Inc., Warsaw, IN (US)

(72) Inventors: Nicholas R. Holderman, Etna Green, IN (US); Jeremy J. Pohler, North Manchester, IN (US); Robert E. Klein, Nappanee, IN (US); Thom E. Gidley, Denver, IN (US); Devon Stump, Nappanee, IN (US); Michael Brown, Warsaw, IN (US)

(73) Assignee: Zimmer, Inc., Warsaw, IN (US)

( * ) Notice: Subject to any disclaimer, the term of this patent is extended or adjusted under 35 U.S.C. 154(b) by 92 days.

(21) Appl. No.: 14/882,686

(22) Filed: Oct. 14, 2015

(65) Prior Publication Data

US 2016/0107354 A1     Apr. 21, 2016

Related U.S. Application Data

(60) Provisional application No. 62/064,774, filed on Oct. 16, 2014.

(51) Int. Cl.
*B29C 45/26*     (2006.01)

(52) U.S. Cl.
CPC ...... *B29C 45/2673* (2013.01); *B29C 45/2675* (2013.01)

(58) Field of Classification Search
CPC ................ B29C 45/2673; B29C 45/2675
USPC .................................................. 425/330
See application file for complete search history.

(56) References Cited

U.S. PATENT DOCUMENTS

| | | | | |
|---|---|---|---|---|
| 1,207,673 A | * | 12/1916 | Willard | B30B 11/007 425/330 |
| 3,547,184 A | * | 12/1970 | Navarro | B22D 17/10 164/312 |
| 4,793,785 A | * | 12/1988 | Osada | B29C 45/02 425/116 |
| 4,927,347 A | * | 5/1990 | Golata | B29C 33/22 249/161 |
| 5,350,289 A | * | 9/1994 | Martin | B29C 31/006 264/328.1 |
| 5,435,953 A | * | 7/1995 | Osada | B29C 45/02 264/102 |

* cited by examiner

*Primary Examiner* — Jill Heitbrink
(74) *Attorney, Agent, or Firm* — Schwegman Lundberg & Woessner, P.A.

(57) ABSTRACT

A modular molding system having a mold base assembly for assembling an interchangeable mold insert assemblage. The assembled mold insert assemblage defines an internal cavity for forming a molded object. Each mold insert assemblage can be disengaged from the mold base assembly and exchanged with a different mold insert assemblage having an internal cavity having different dimensions.

21 Claims, 10 Drawing Sheets

MODULAR MOLD SYSTEM

CLAIM OF PRIORITY

This application claims the benefit of U.S. Provisional Patent Application Ser. No. 62/064,774, filed on Oct. 16, 2014, the benefit of priority of which is claimed hereby, and which is incorporated by reference herein in its entirety.

TECHNICAL FIELD

This document pertains generally, but not by way of limitation, to a modular apparatus with interchangeable mold inserts for producing molded objects of different sizes and configurations.

BACKGROUND

Large scale molding of molded objects typically involves a plurality of molded elements that are assembled to form a cavity for receiving a hardening fluid that hardens into a shape corresponding to the size and shape of the cavity. After the fluid has hardened, the mold elements are disassembled to expose the molded object for removal. The process can be repeated by reassembling the molded elements and feeding additional fluid into the cavity. As the shape and size of the cavity defines the characteristics of the molded object, producing a molded object having different characteristics requires replacement of the mold elements to change the size and shape of the cavity. The assembly and disassembly of the mold elements are typically automated to speed the molding process. Accordingly, replacing the mold elements to change the characteristics for the cavity typically requires substantial disassembly of the molding system to remove and replace the mold elements. In addition, as the fluid is often injected into the cavity under pressure to avoid bubbling or other undesirable formations in the molded object, the mold elements are often structurally reinforced to withstand the additional pressure. The structural reinforcement typically substantially increases the weight of the mold elements further complicating the replacement process. Accordingly, a primary limiting factor in producing molded objects having different characteristics is the inherent difficulty required to replace the mold elements to produce differently sized or shaped molded objects.

Overview

The present inventors have recognized, among other things, that a problem to be solved can include the difficulty involved in reconfiguring a molding system to produce differently sized or shaped molded objects. In an example, the present subject matter can provide a solution to this problem, such as by a modular molding system having a mold base assembly and at least one mold insert assemblage that can be releasably mounted on the mold base assembly. The mold base assembly can have at least a stationary mold base for receiving a base mold insert and a transitory mold base for receiving a transitory mold insert. The transitory mold base can move the transitory mold insert between a closed position in which the transitory mold insert is operably engaged to the base mold insert and an open position in which the transitory mold insert is separated from the base mold insert. In the closed position, the transitory mold insert and the base mold insert can cooperate to define an internal cavity for receiving a hardening fluid, gel or other hardening or moldable material. In an example, the base mold insert can be slidably engaged to the base mold insert such that base mold insert can be slid off the base mold insert and exchanged with a different base mold insert. In certain examples, the transitory mold insert can be disengaged from the transitory mold base when positioned in the closed position and slid out of the mold base assembly with the base mold insert. The arrangement simplifies the reconfiguration of the modular molding system to produce differently sized or shaped molded elements by allowing the mold insert assemblage to be quickly disengaged from the mold base assembly.

A modular molding system according to at least one example of the present disclosure can include a stationary mold base having a base engagement feature and a transitory mold base movable along a first axis intersecting the stationary mold base. A base mold insert having a sliding engagement feature can be slid along a second axis to engage the sliding engagement feature to the base engagement feature of the stationary mold base. A transitory mold insert having a releasable feature can be engaged to the transitory mold base. The transitory mold base can move the transitory mold insert along the first axis between a closed position in which the transitory mold insert is engaged to the base mold insert and an open position in which the transitory mold insert is disengaged from the base mold insert.

A method of molding a molded object according to an example of can include providing a stationary mold base having a base engagement feature and aligning a transitory mold base with the stationary mold base along a first axis. The method can also include sliding a sliding engagement feature of a base mold insert along a second axis to engage the base mold insert to the stationary mold base. The method can also include engaging a transitory mold insert to the base mold insert. The base mold insert can define a base mold cavity and the transitory mold insert defines a first mold cavity. The method can also include moving the transitory mold insert along the first axis into engagement with the base mold insert such that the base mold cavity and the first mold cavity define an internal mold cavity and injecting a hardening composition into the internal mold cavity. The method can further include moving the transitory mold insert out of engagement with the base mold insert.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
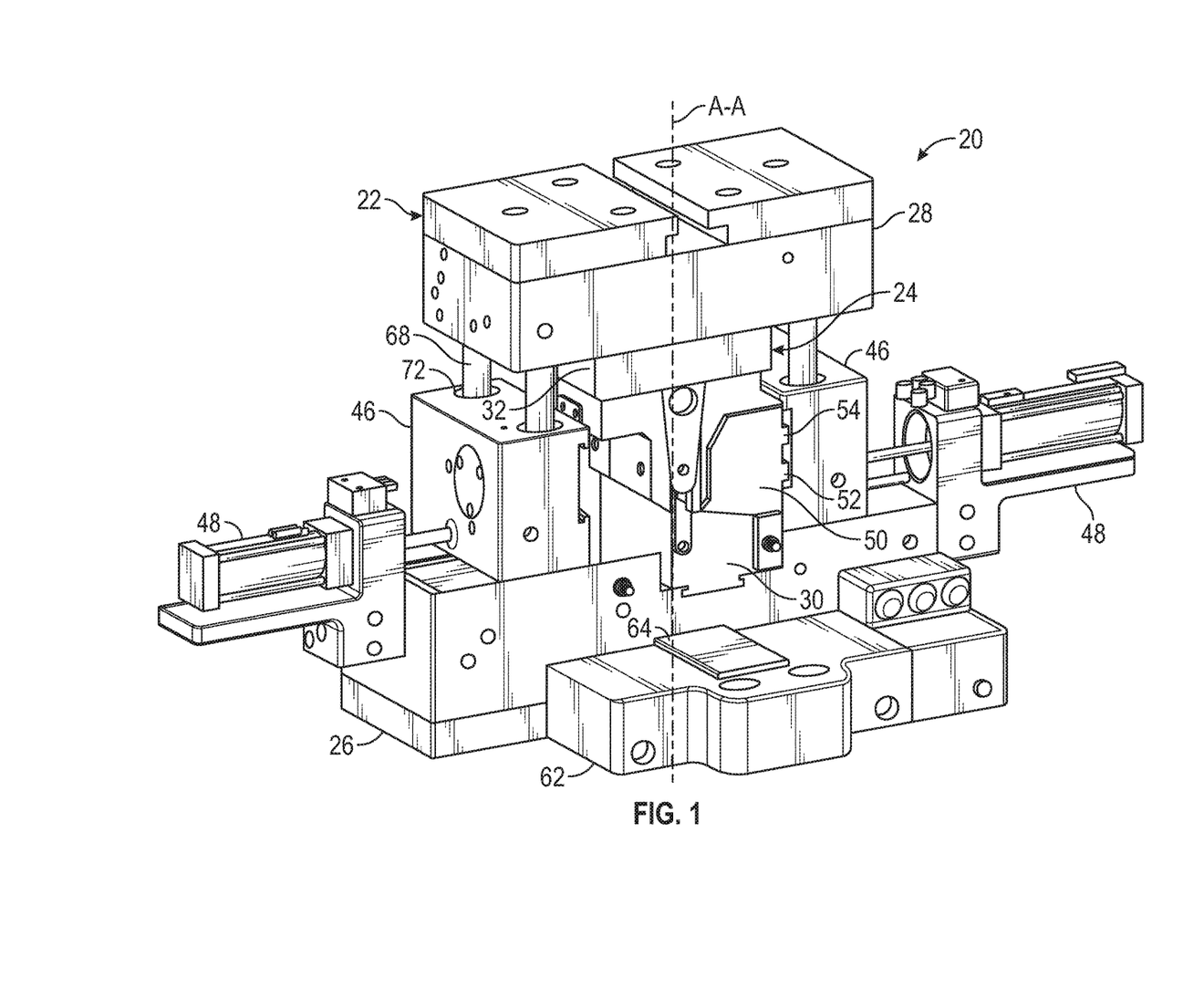
FIG. 1 is a perspective view of a modular molding system, in accordance with at least one example of the present disclosure.
Figure 2:
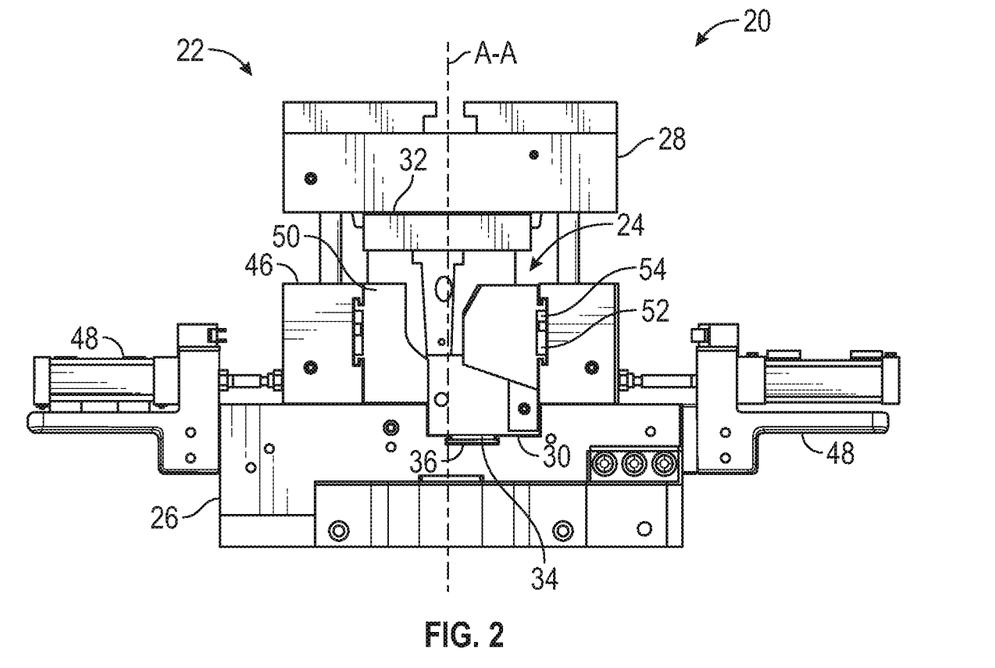
FIG. 2 is a front view of the modular molding system depicted in FIG. 1, in accordance with at least one example of the present disclosure.

As depicted in FIGS. 1-2, a modular molding system 20 for forming a molded object, according to at least one example of the present disclosure, can include a mold base assembly 22 and at least one mold insert assemblage 24. Each mold insert assemblage 24 can include a plurality of mold inserts that can be assembled by the mold base assembly 22 as depicted in FIGS. 1-2. When assembled, the mold inserts can cooperate to define an interior cavity that can receive a hardening fluid, gel or other hardening or moldable material that can harden into a molded object having a shape and size corresponding to the dimensions of the interior cavity. At least one of the mold inserts can be slidably engaged to a corresponding mold base allowing rapid replacement of the mold inserts. In this configuration, a mold insert assemblage 24 having a mold cavity having a first size and shape can be removed from the base mold assembly 22 and replaced with a different mold insert assemblage 24 having an interior mold cavity with a different size or shape. This arrangement allows a single mold base assembly 22 to produce molded objects of different shapes and sizes with minimal downtime being required to reconfigure the molding system 20.

As depicted in FIGS. 1-4, in an example, the mold base assembly 22 can include a stationary mold base 26 and a transitory mold base 28. The mold base assembly 22 can include a reciprocating piston, mechanical arm, hydraulic or pneumatic press, linear actuator or other mechanical apparatus for moving the transitory mold base 28 along a linear axis A-A (see FIGS. 2-4) intersecting the stationary mold base 26.

Figure 3:
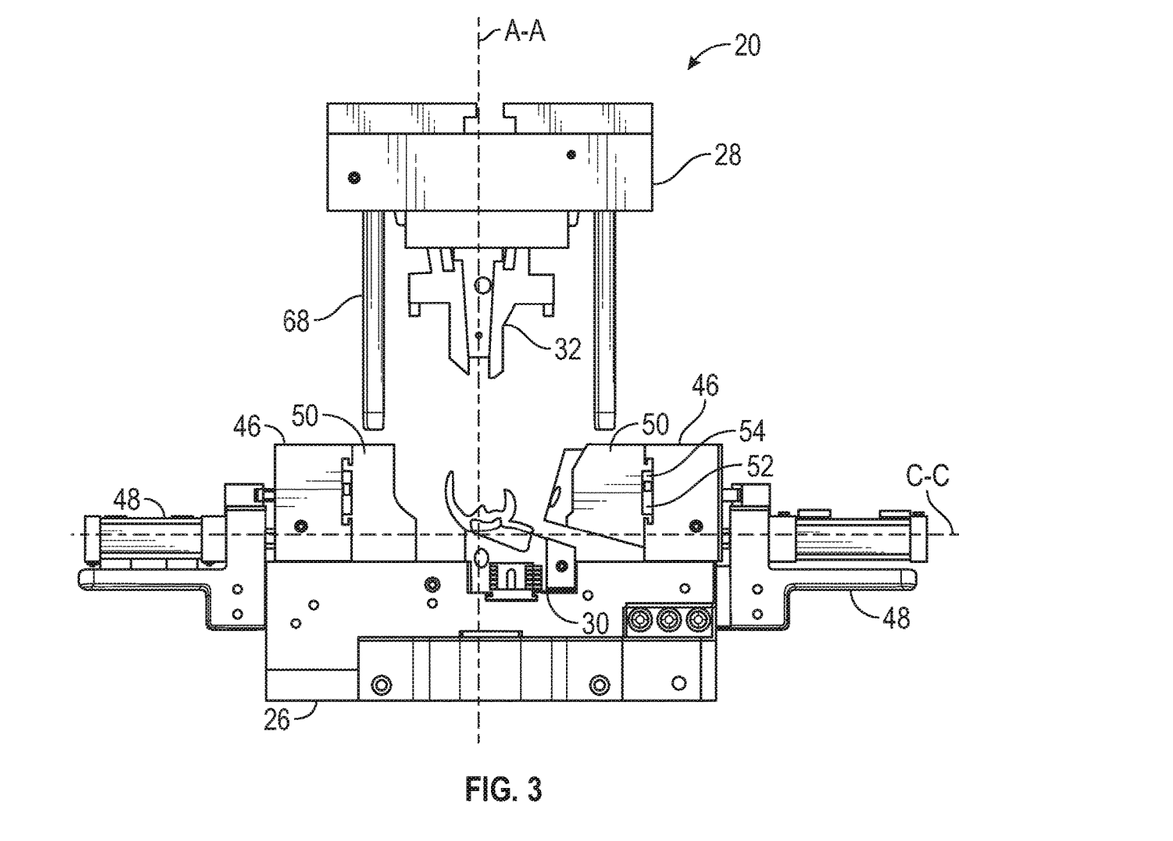
FIG. 3 is a front view of the modular molding system depicted in FIG. 1 with a transitory mold base and a pair of side mold bases, each positioned in an open position, in accordance with at least one example of the present disclosure.
Figure 4:
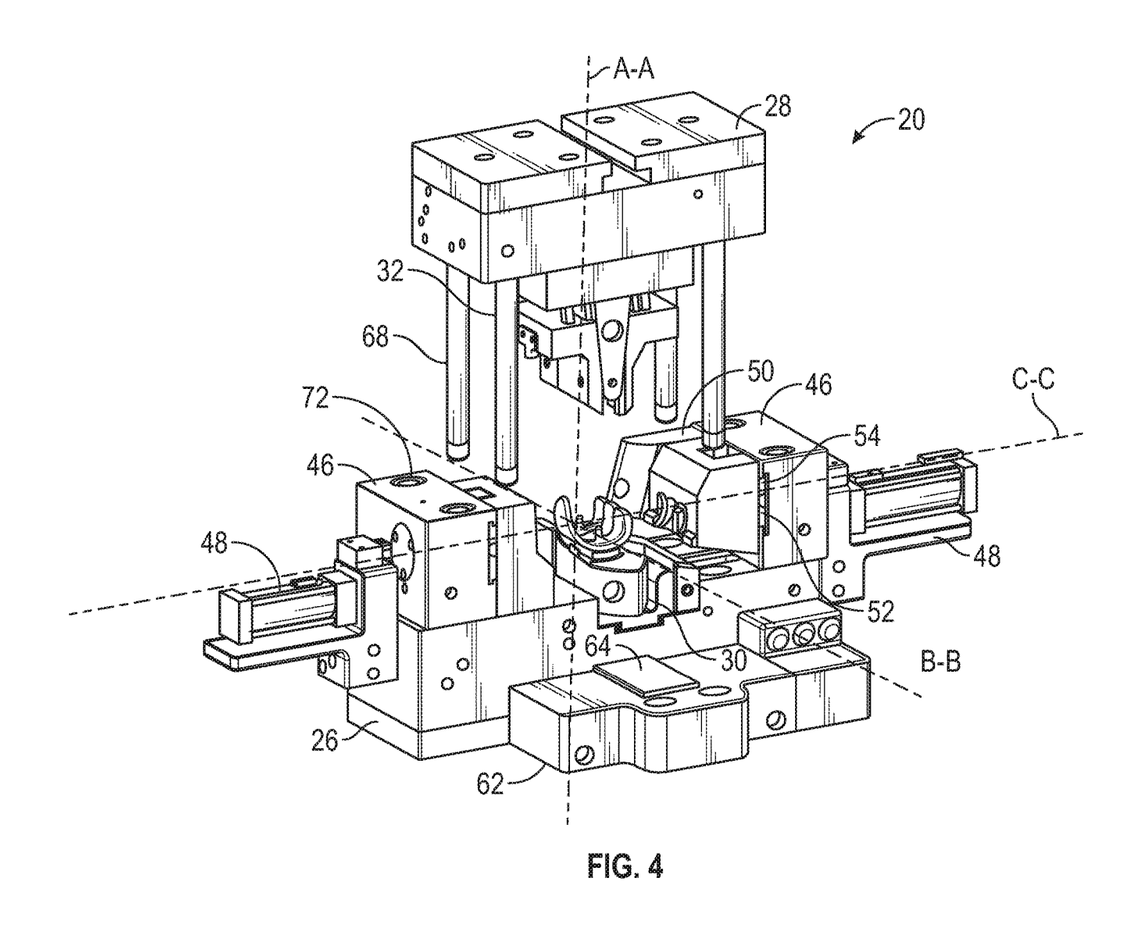
FIG. 4 is a perspective view of the modular molding system depicted in FIG. 3, in accordance with at least one example of the present disclosure.
Figure 5:
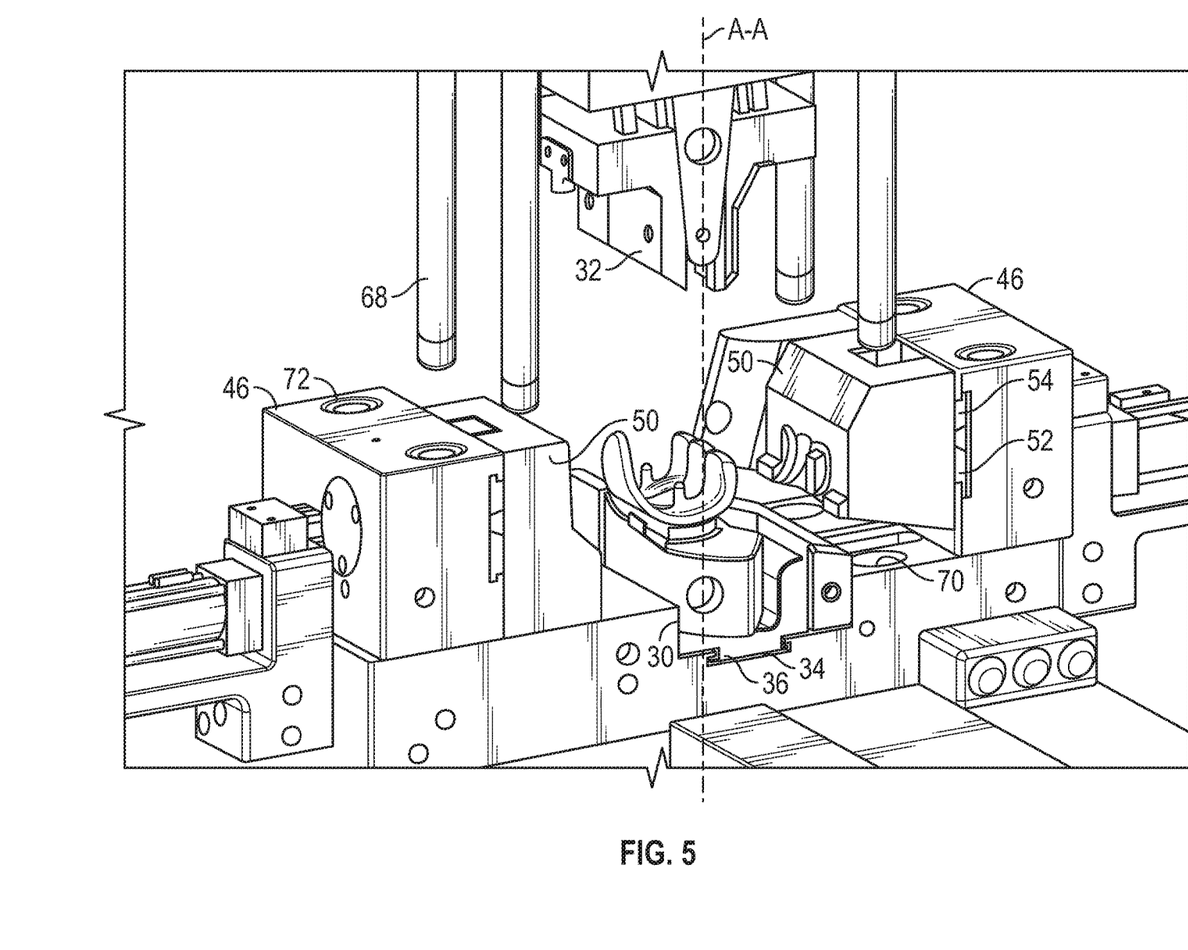
FIG. 5 is a perspective view of a portion of the modular molding system depicted in FIG. 3, in accordance with at least one example of the present disclosure.
Figure 6:
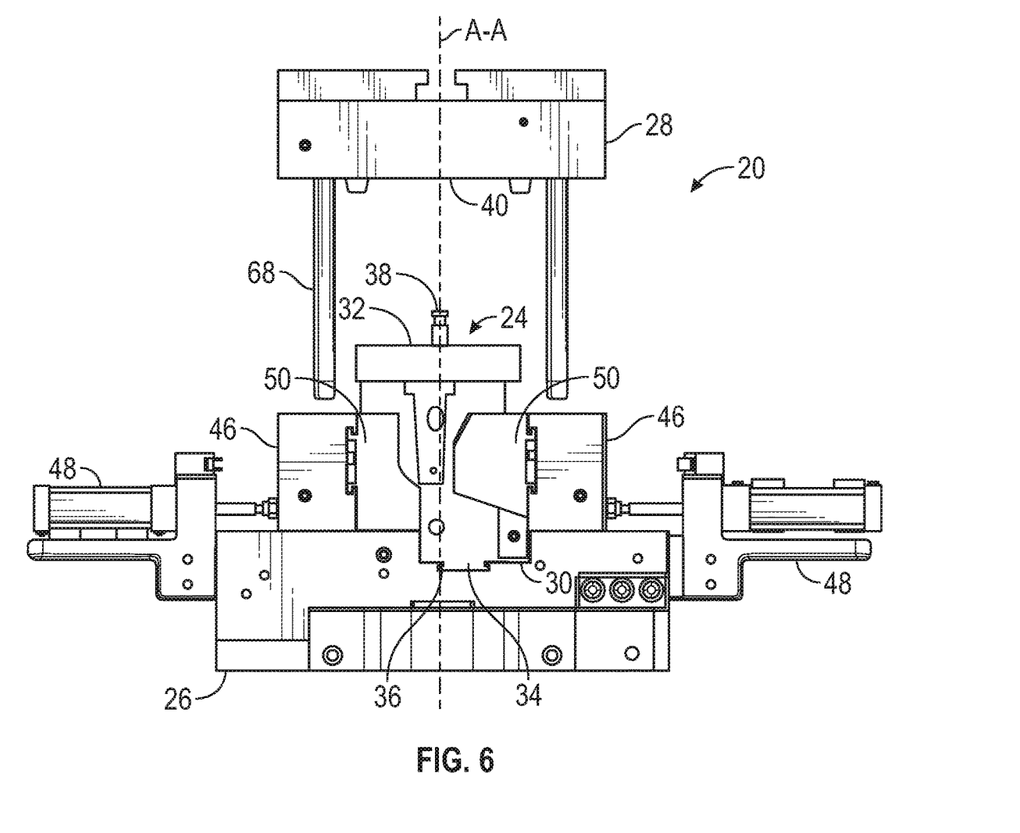
FIG. 6 is a front view of the modular molding system depicted in FIG. 3, in accordance with at least one example of the present disclosure.

As depicted in FIGS. 1-6, in an example, each mold insert assemblage 24 can include a base mold insert 30 and a transitory mold insert 32. The base mold insert 30 can define a base cavity and include a sliding engagement feature 34. The stationary mold base 26 can similarly include a base engagement feature 36 corresponding to the sliding engagement feature 34 of the base mold insert 30 such that the base mold insert 30 can be slidably engaged to stationary mold base 26 by sliding the base mold insert 30 along an axis parallel to a linear axis B-B, as shown in FIG. 4. As depicted in FIGS. 5 and 6, the sliding engagement feature 34 and the base engagement feature 36 can comprise a protrusion having angled walls fitted within a notch having a corresponding shape to prevent separation of the base mold insert 30 from the stationary mold base 26 along axes transverse to axis B-B (see FIG. 4). As depicted in FIG. 6, the transitory mold insert 32 can define a secondary mold cavity include a locking pin 38 or other engagable protrusion. The transitory mold base 28 can also further include a releasable clamp 40 for releasably engaging the locking pin 38 of the transitory mold insert 32.

As depicted in FIGS. 2-3, in an example, the transitory mold base 28 moves the transitory mold insert 32 along axis A-A between a closed position and an open position. In the closed position, the transitory mold insert 32 can engage the base mold insert 30 such that the secondary mold cavity and the base cavity cooperate to define a singular, enclosed mold cavity for receiving a hardening fluid that hardens into the molded object. The dimensions of the secondary mold cavity and the base cavity define the resulting dimensions of the molded object. In an example, at least one of the transitory mold insert 32 and the transitory mold base 28 includes at least one injector port through which a hardening fluid can be injected into the formed singular mold cavity. In an open position, the transitory mold insert 32 is disengaged from the base mold insert 30 to permit removal of the molded object.

As depicted in FIG. 6, in an example, the releasable clamp 40 of the transitory mold base 28 can release the locking pin 40 of the transitory mold insert 32 when the transitory mold insert 32 is positioned in the closed position. In this configuration, the base mold insert 30 and engaged transitory mold insert 32 can be disengaged from the base mold assembly 22 by sliding the base mold insert 30 along an axis parallel to axis B-B (see FIG. 4). Similarly, the mold insert assemblage 24 can be replaced by sliding a different mold insert assemblage 24 onto the base mold assembly 22 and clamping the transitory mold base 28 to the locking pin 40 of the replacement transitory mold insert 32. In an example, the base mold insert 30 and transitory mold insert 32 can include interlocking structures to prevent shifting of the transitory mold insert 32 relative to the base mold insert 30 during removal of the mold insert assemblage 24.

Figure 10:
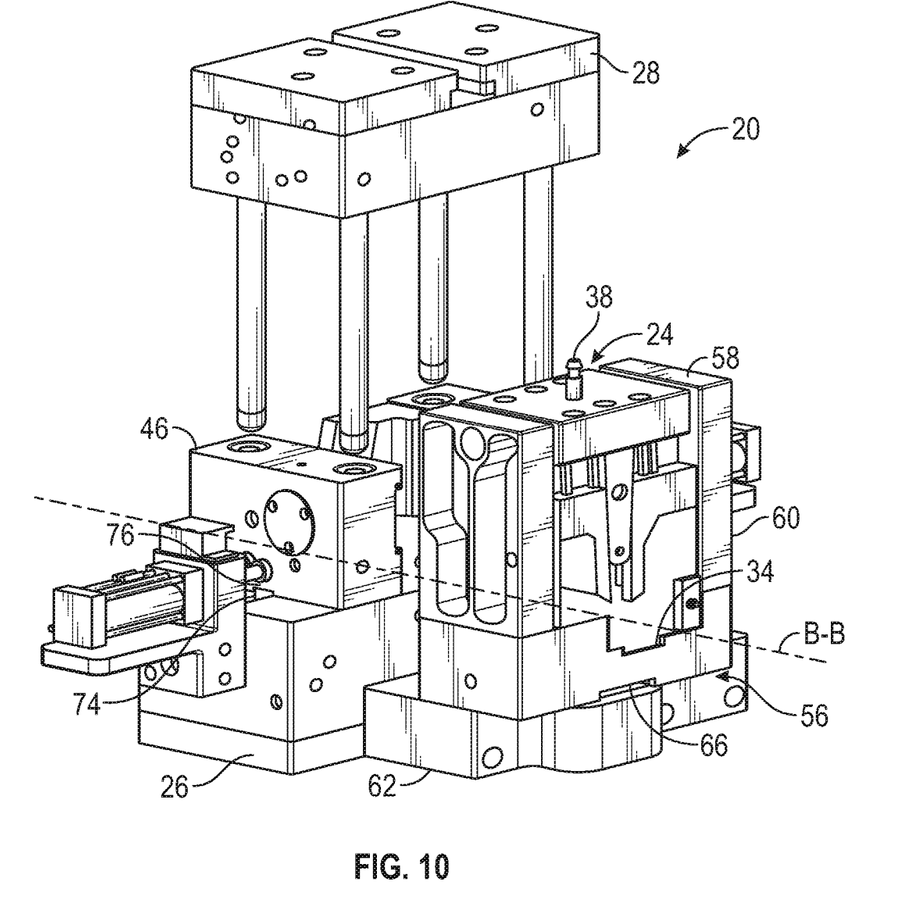
FIG. 10 is a perspective view of the modular molding system depicted in FIG. 7 with the carrier assembly being removed from the mold base assembly, in accordance with at least one example of the present disclosure.

As depicted in FIGS. 1-6, in an example, the mold base assembly 22 includes at least one side mold base 46. Each side mold base 46 can be moved along an axis C-C (see FIGS. 3 and 4) by at least one positioning assembly 48. In an example, the axis C-C can be perpendicular to axis A-A. The positioning assembly 48 can include a reciprocating piston as depicted in FIGS. 1-4, a mechanical arm, hydraulic or pneumatic press or other mechanical apparatus for moving the corresponding side mold base 46 along the linear axis C-C (see FIGS. 3 and 4). In an example, as shown in FIG. 10, the stationary mold base 26 can include a track 74 oriented parallel to the linear axis C-C. In this configuration, each side mold base 46 can include a slider element 76 slidably engaged to the track 74 such that the track 74 guides each side mold base 46 along the axis C-C as the positioning assembly 48 moves the side mold base 46 along axis C-C.

As depicted in FIGS. 1-6, in an example, each mold insert assemblage 24 can include at least one side mold insert 50 corresponding to each side mold base 46. Each side mold insert 50 can define a side mold cavity and include a sliding engagement feature 52. The side mold base 46 can similarly include a base engagement feature 54 corresponding to the sliding engagement feature 52 of the side mold insert 50 such that the side mold insert 50 can be slidably engaged to side mold base 46 by sliding the side mold insert 50 along an axis parallel to the linear axis B-B (see FIG. 4). The sliding engagement feature 52 and the base engagement feature 54 can comprise a protrusion having angled walls fitted within a notch having a corresponding shape to prevent separation of the side mold insert 50 from the side mold base 46 along axes transverse to axis B-B.

As depicted in FIGS. 1-6, in an example, each side mold base 46 can move the corresponding side mold insert 50 along axis C-C (see FIGS. 3 and 4) between a closed position and an open position. In the closed position, each side mold insert 50 can engage the base mold insert 30 such that the side cavity and the base cavity cooperate to define a singular, enclosed mold cavity for receiving a hardening fluid that hardens into the molded object. In an example, each side mold insert 50 can similarly engage the transitory mold insert 32 such that the secondary mold cavity, side cavities and base cavity form a singular mold cavity. In an example, at least one side mold base 46 can be positioned on each opposing side of the stationary mold base 26 such that the side cavities of the side mold inserts 50 define the sides of the singular internal cavity. In an example, at least one of the side mold inserts 50 includes at least one injector port through which a hardening fluid can be injected into the formed singular mold cavity. In an open position, the side mold inserts 50 can be disengaged from the base mold insert 30 to permit removal of the molded object.

In an example, when positioned in the closed position, the base mold insert 30 and the side mold inserts 50 can be slid along axes parallel to axis B-B (see FIG. 4) to disengage the base mold insert 30 from the stationary mold base 26 and the side mold inserts 50 from the corresponding side mold base 46. The base mold insert 30 and the side mold inserts 50 can include interlocking structures to prevent shifting of the side mold inserts 50 relative to the base mold insert 30 during removal of the mold insert assemblage 24.

As depicted in FIGS. 3-6, in an example, the transitory mold base 28 can include at least one guide pin 68 that can be engaged to at least one of the stationary mold base 26 and the side mold base 46. In an example, as shown in FIG. 5, the stationary mold base 26 can include at least one guide port 70 for receiving a corresponding guide pin 68 to maintain the transitory mold base 28 along axis A-A (see FIG. 4) as the transitory mold insert 32 is moved into engagement with the base mold insert 30. In certain examples, each side mold base 46 can further include at least one alignment hole 72 through which the guide pin 68 can be inserted through to engage the guide port 70. The alignment hole 72 can maintain the side mold base 46 in the proper position when the side mold insert 50 is moved into engagement with the base mold insert 30. The guide pin 68 can retain the mold insert assemblage 24 in the assembled configuration when the hardening fluid is administered at a high pressure.

Figure 7:
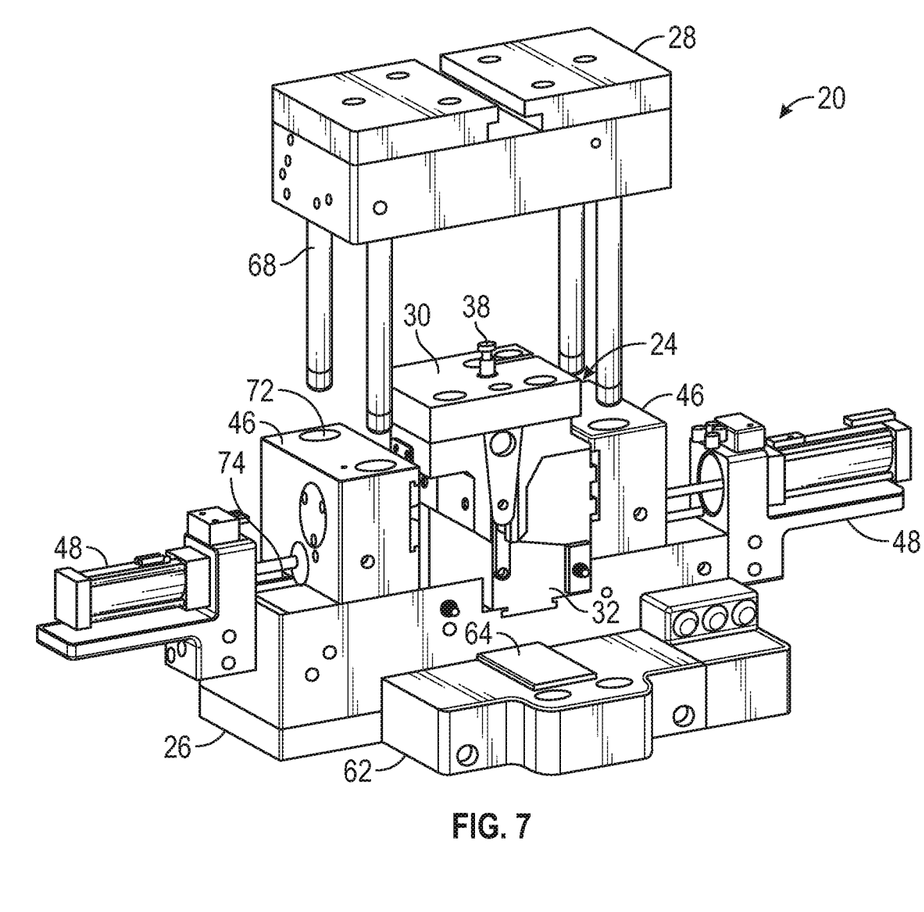
FIG. 7 is a perspective view of the modular molding system depicted in FIG. 1 with the transitory mold base disengaged from a transitory mold insert, in accordance with at least one example of the present disclosure.
Figure 8:
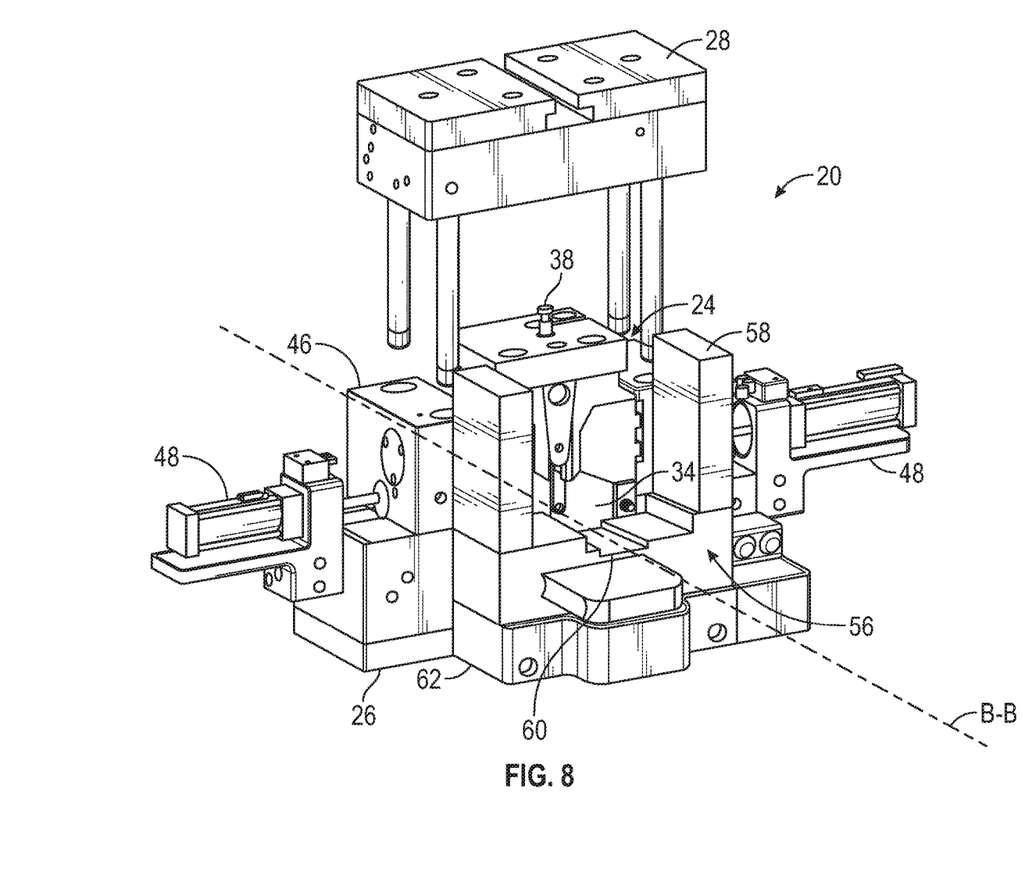
FIG. 8 is a perspective view of the modular molding system depicted in FIG. 7 with a mold insert assemblage being transitioned to a carrier assembly, in accordance with at least one example of the present disclosure.
Figure 9:
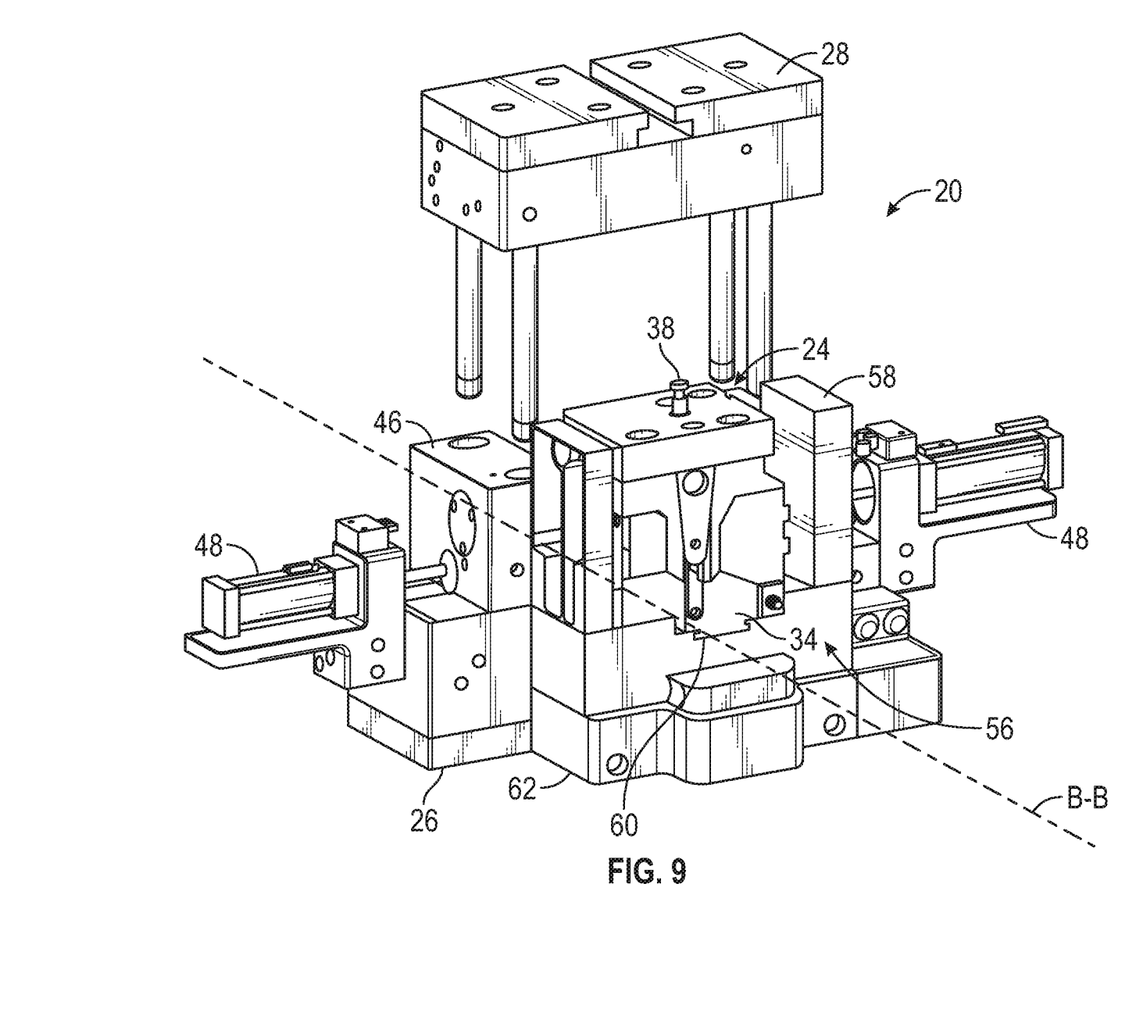
FIG. 9 is a perspective view of the modular molding system depicted in FIG. 7 with a mold insert assemblage transitioned to the carrier assembly, in accordance with at least one example of the present disclosure.

As depicted in FIG. 7, in an example, the stationary mold base 26 can include a carrier platform 62 for receiving a carrying assembly. One example of a carrying assembly is carrying assembly 56 shown in FIGS. 8-10. The carrying assembly 56 can be configured to receive at least one mold insert of the mold insert assemblage 24. The carrying assembly 56 can include a carrying frame 58 having at least one insert engagement feature 60 corresponding to at least one of the base engagement feature 36, 54 for the stationary mold base 26 or side mold base 46. In an example, the carrying frame 58 can include a U-shaped frame having at least one insert engagement feature 60 positioned to align with each base engagement feature 36, 54 such that the base mold insert 30 and each side mold insert 50 can be slid from the base engagement feature 36, 54 to the corresponding insert engagement feature 60.

With further reference to FIGS. 7 and 10, the carrier platform 62 can include a guide element 64 that can be engaged to a receiving notch 66 in the carrying frame 58, as shown in FIG. 10. The guide element 64 can be positioned to horizontally align the carrying frame 58 with the mold base assembly 22 to receive the mold insert assemblage 24. Similarly, the carrier platform 62 can be sized to vertically align the carrying frame 58 with the mold base assembly 22 to receive the mold insert assemblage 24.

Various Notes & Examples

Example 1 can include subject matter, such as can include a modular molding system 20 including a stationary mold base 26 having a base engagement feature 36; a transitory mold base 28; a base mold insert 30 and a transitory mold insert 32. The transitory mold base 28 can be moved along a first axis A-A intersecting the stationary mold base 26. The base mold insert 30 having a sliding engagement feature 34. The base mold insert 30 can be slidable along a second axis B-B to engage the sliding engagement feature 34 to the base engagement feature 36. The transitory mold insert 32 having a releasable feature can be engaged to the transitory mold base 28. The transitory mold base 28 can move the transitory mold insert 32 along the first axis A-A between a closed position in which the transitory mold insert 32 is engaged to the base mold insert 30 and an open position in which the transitory mold insert 32 is disengaged from the base mold insert 30.

Example 2 can include, or can optionally be combined with the subject matter of Example 1, to optionally include that the second axis B-B is perpendicular to the first axis A-A.

Example 3 can include, or can optionally be combined with the subject matter of one or any combination of Examples 1 or 2 to optionally include that the releasable feature of the transitory mold insert 32 is releasable from the transitory mold base 28 when the transitory mold insert 32 is positioned in the closed position.

Example 4 can include, or can optionally be combined with the subject matter of one or any combination of the preceding claims, to optionally include that the base mold insert 30 defines a base mold cavity and the transitory mold insert 32 defines a secondary mold cavity. The base mold cavity and the secondary mold cavity cooperate to define an internal mold cavity when the transitory mold insert 32 is positioned in the closed position.

Example 5 can include, or can optionally be combined with the subject matter of Example 4, to optionally include at least one side mold base 46 and at least one side mold insert 50. The at least one side mold base 46 can be moved along a third axis C-C. The side mold base 46 having a second base engagement feature 36. The least one side mold insert 50 having a second sliding engagement feature 34 slidable parallel to the second axis B-B to engage the second base engagement feature 36. The side mold base 46 moves the side mold insert 50 along the third axis C-C between a closed position in which the side mold insert 50 is engaged to the base mold insert 30 and an open position in which the side mold insert 50 is disengaged from the base mold insert 30.

Example 6 can include, or can optionally be combined with the subject matter of Example 5, to optionally include that the third axis C-C is perpendicular to the first axis A-A.

Example 7 can include, or can optionally be combined with the subject matter of one or any combination of Examples 5 or 6 to optionally include that each side mold insert 50 defines a side mold cavity. The base mold cavity, the secondary mold cavity and each side mold cavity cooperate to define the internal mold cavity when the side mold insert 50 is positioned in the closed position.

Example 8 can include, or can optionally be combined with the subject matter of one or any combination of Examples 5-7 to optionally include that the stationary mold base 26 defines at least one elongated track 74 parallel to the third axis C-C. Each side mold base 46 can include a slider slidably that can be engaged to the elongated track 74 such that the elongated track 74 guides the side mold bases 46 as the side mold base 46 moves along the third axis C-C.

Example 9 can include, or can optionally be combined with the subject matter of one or any combination of Examples 5-8 to optionally include at least one positioning assembly corresponding to each side mold base 46 and operable to move the side mold base 46 along the third axis C-C.

Example 10 can include, or can optionally be combined with the subject matter of one or any combination of Examples 5-9 to optionally include that the transitory mold base 28 further includes at least one positioning pin 68 insertable into a corresponding guide port 70 of the stationary mold base 26 as the transitory mold insert 32 is moved into the closed position.

Example 11 can include, or can optionally be combined with the subject matter of Example 10, to optionally include that the side mold base 46 includes at least one alignment hole that aligns with the guide port 70 of the stationary mold base 26 when the side mold base 46 is positioned in the closed position for receiving the at least one positioning pin 68.

Example 12 can include, or can optionally be combined with the subject matter of one or any combination of Examples 1-4 to optionally include a carrier assembly having at least one carrier engagement feature. The carrier assembly is positionable to align the carrier engagement feature with the base engagement feature 36 such that the base mold insert 30 is slidable along the second axis B-B to transition the base mold insert 30 from the stationary mold base 26 to the carrier assembly.

Example 13 can include, or can optionally be combined with the subject matter of Example 12, to optionally include that the carrier assembly can include at least one side wall for receiving the base mold insert 30 and the transitory mold insert 32 positioned in the closed position.

Example 14 can include subject matter, such as can include a method of molding a molded object, including providing a stationary mold base 26 having a base engagement feature 36. The method can also include aligning a transitory mold base 28 with the stationary mold base 26 along a first axis A-A. The method can also include sliding a sliding engagement feature 34 of a base mold insert 30 along a second axis B-B to engage the base mold insert 30 to the stationary mold base 26. The base mold insert 30 defines a base mold cavity. The method can also include engaging a transitory mold insert 32 to the base mold insert 30. The transitory mold insert 32 can define a first mold cavity. The method can also include moving the transitory mold insert 32 along the first axis A-A into engagement with the base mold insert 30 such that the base mold cavity and the first mold cavity define an internal mold cavity. The method can also include injecting a hardening composition into the internal mold cavity and moving the transitory mold insert 32 out of engagement with the base mold insert 30.

Example 15 can include, or can optionally be combined with the subject matter of Example 14, to optionally include releasing the transitory mold insert 32 from the transitory mold base 28 when the transitory mold insert 32 is positioned in the closed position.

Example 16 can include, or can optionally be combined with the subject matter of one or any combination of Examples 14 or 15 to optionally include that the base mold insert 30 defines a base mold cavity and the transitory mold insert 32 defines a secondary mold cavity. The base mold cavity and the secondary mold cavity cooperate to define the internal mold cavity when the transitory mold insert 32 is positioned in the closed position.

Example 17 can include, or can optionally be combined with the subject matter of Example 16, to optionally include providing at least one side mold base 46 having a second base engagement feature 36; sliding a side mold insert 50 parallel to the second axis B-B to engage the side mold insert 50 to the side mold base 46; and moving the side mold base along a third axis C-C between a closed position in which the side mold insert 50 is engaged to the base mold insert 30 and an open position in which the side mold insert 50 is disengaged from the base mold insert 30.

Example 18 can include, or can optionally be combined with the subject matter of Example 17, to optionally include that each side mold insert 50 defines a side mold cavity. The base mold cavity, the secondary mold cavity and each side mold cavity can cooperate to define the internal mold cavity when the side mold insert 50 is positioned in the closed position.

Example 19 can include, or can optionally be combined with the subject matter of one or any combination of Examples 17 or 18 to optionally include positioning a carrier assembly having an insert engagement feature 60 in alignment with the stationary mold base 26; and sliding the base mold insert 30 along the second axis B-B from the stationary mold base 26 to the carrier assembly.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A modular molding system, comprising:
   a stationary mold base having a base engagement feature;
   a transitory mold base movable along a first axis intersecting the stationary mold base;
   a base mold insert having a sliding engagement feature, wherein the base mold insert is slidable along a second axis to engage the sliding engagement feature to the base engagement feature; and
   a transitory mold insert having a releasable feature engagable to the transitory mold base, wherein the transitory mold base is movable along the first axis to engage the transitory mold base to the releasable feature of the transitory mold insert and engage the transitory mold base to the transitory mold insert;
   wherein the transitory mold base moves the transitory mold insert along the first axis between a closed position in which the transitory mold insert is engaged to the base mold insert and an open position in which the transitory mold insert is disengaged from the base mold insert.

2. The modular molding system of claim 1, wherein the second axis is perpendicular to the first axis.

3. The modular molding system of claim 1, wherein the releasable feature of the transitory mold insert is releasable from the transitory mold base when the transitory mold insert is positioned in the closed position.

4. The modular molding system of claim 1, wherein the base mold insert defines a base mold cavity and the transitory mold insert defines a secondary mold cavity;
   wherein the base mold cavity and the secondary mold cavity cooperate to define an internal mold cavity when the transitory mold insert is positioned in the closed position.

5. The modular molding system of claim 4, further comprising:
   at least one side mold base movable along a third axis, the side mold base having a second base engagement feature; and
   at least one side mold insert having a second sliding engagement feature slidable parallel to the second axis to engage the second base engagement feature;
   wherein the side mold base moves the side mold insert along the third axis between a closed position in which the side mold insert is engaged to the base mold insert and an open position in which the side mold insert is disengaged from the base mold insert.

6. The modular molding system of claim 5, wherein the third axis is perpendicular to the first axis.

7. The modular molding system of claim 5, wherein each side mold insert defines a side mold cavity, wherein the base mold cavity, the secondary mold cavity and each side mold cavity cooperate to define the internal mold cavity when the side mold insert is positioned in the closed position.

8. The modular molding system of claim 5, wherein the stationary mold base defines at least one elongated track parallel to the third axis;
   wherein each side mold base includes a slider slidably engagable to the elongated track such that the elongated track guides the side mold bases as the side mold base moves along the third axis.

9. The modular molding system of claim 5, further comprising:
   at least one positioning assembly corresponding to each side mold base and operable to move the side mold base along the third axis.

10. The modular molding system of claim 5, wherein the transitory mold base includes at least one positioning pin insertable into a corresponding guide port of the stationary mold base as the transitory mold insert is moved into the closed position.

11. The modular molding system of claim 10, wherein the side mold base includes at least one alignment hole that aligns with the guide port of the stationary mold base when the side mold base is positioned in the closed position for receiving the at least one positioning pin.

12. The modular molding system of claim 1, further including a carrier assembly having at least one carrier engagement feature;
   wherein the carrier assembly is positionable to align the carrier engagement feature with the base engagement feature such that the base mold insert is slidable along the second axis to transition the base mold insert from the stationary mold base to the carrier assembly.

13. The modular molding system of claim 12, wherein the carrier assembly includes at least one side wall for receiving the base mold insert and the transitory mold insert positioned in the closed position.

14. The modular molding system 12, wherein the transitory mold insert is engagable to the base mold insert when positioned in the closed position such that sliding the base mold insert along the second axis also slides the transitory mold insert onto the carrier assembly with the base mold insert.

15. A method of molding a molded object, comprising:
   providing a stationary mold base having a base engagement feature;

aligning a transitory mold base with the stationary mold base along a first axis;

sliding a sliding engagement feature of a base mold insert along a second axis to engage the base mold insert to the stationary mold base, wherein the base mold insert defines a base mold cavity;

moving the transitory mold base along the first axis into engagement with a transitory mold insert, wherein the transitory mold insert defines a first mold cavity;

moving the transitory mold insert along the first axis into a closed position, where the transitory mold insert is engaged with the base mold insert such that the base mold cavity and the first mold cavity cooperate to define an internal mold cavity;

injecting a hardening composition into the internal mold cavity; and moving the transitory mold insert out of engagement with the base mold insert.

16. The method of claim 15, further comprising:

releasing the transitory mold insert from the transitory mold base when the transitory mold insert is positioned in the closed position.

17. The method of claim 15, wherein the base mold insert defines a base mold cavity and the transitory mold insert defines a secondary mold cavity;

wherein the base mold cavity and the secondary mold cavity cooperate to define the internal mold cavity when the transitory mold insert is positioned in the closed position.

18. The method of claim 17, further comprising:

providing at least one side mold base having a second base engagement feature;

sliding a side mold insert parallel to the second axis to engage the side mold insert to the side mold base; and moving the side mold base along a third axis between a closed position in which the side mold insert is engaged to the base mold insert and an open position in which the side mold insert is disengaged from the base mold insert.

19. The method of claim 18, wherein each side mold insert defines a side mold cavity, wherein the base mold cavity, the secondary mold cavity and each side mold cavity cooperate to define the internal mold cavity when the side mold insert is positioned in the closed position.

20. The method of claim 18, further comprising:

positioning a carrier assembly having an insert engagement feature in alignment with the stationary mold base; and sliding the base mold insert along the second axis from the stationary mold base to the carrier assembly.

21. The method of claim 20, further comprising:

moving the transitory mold base along the first axis out of engagement with the transitory mold insert while the transitory mold insert remains in the closed position;

wherein sliding the base mold insert along the second axis from the stationary mold base also slides the transitory mold base out of alignment with the transitory mold base.

\* \* \* \* \*